(12) United States Patent
Marukawa et al.

(10) Patent No.: US 10,583,719 B2
(45) Date of Patent: Mar. 10, 2020

(54) ROOF STRUCTURE FOR VEHICLE

(71) Applicant: HONDA MOTOR CO., LTD., Tokyo (JP)

(72) Inventors: Taiga Marukawa, Wako (JP); Tadashi Masuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 16/026,534

(22) Filed: Jul. 3, 2018

(65) Prior Publication Data
US 2019/0001797 A1    Jan. 3, 2019

(30) Foreign Application Priority Data
Jul. 3, 2017    (JP) .................. 2017-130330

(51) Int. Cl.
| | |
|---|---|
| *B60J 7/043* | (2006.01) |
| *B60Q 3/00* | (2017.01) |
| *B60J 7/00* | (2006.01) |
| *B60Q 3/51* | (2017.01) |
| *B60Q 3/74* | (2017.01) |
| *B62D 25/06* | (2006.01) |

(52) U.S. Cl.
CPC ............ *B60J 7/043* (2013.01); *B60J 7/0084* (2013.01); *B60Q 3/51* (2017.02); *B60Q 3/74* (2017.02); *B62D 25/06* (2013.01)

(58) Field of Classification Search
CPC ............... B60Q 3/54; B60Q 3/51; B60J 7/043
USPC .................... 296/216.01–224, 214; 362/490
See application file for complete search history.

(56) References Cited

U.S. PATENT DOCUMENTS

| | | | | |
|---|---|---|---|---|
| 5,357,408 | A * | 10/1994 | Lecznar | B60Q 3/51 |
| | | | | 296/214 |
| 6,467,937 | B2 * | 10/2002 | Nagata | B60Q 3/51 |
| | | | | 362/488 |
| 6,749,324 | B2 * | 6/2004 | Nagai | B60Q 3/51 |
| | | | | 362/365 |

(Continued)

FOREIGN PATENT DOCUMENTS

| | | |
|---|---|---|
| JP | H10-100790 A | 4/1998 |
| JP | 2002-36948 A | 2/2002 |

(Continued)

OTHER PUBLICATIONS

Office Action dated Jan. 29, 2019, issued in counterpart JP Application No. 2017-130330, with English translation (9 pages).

*Primary Examiner* — Dennis H Pedder
(74) *Attorney, Agent, or Firm* — Westerman, Hattori, Daniels & Adrian, LLP

(57) ABSTRACT

A roof structure includes: a roof panel 11; a sunroof unit 13; a roof lining 10; and a roof lamp 17. The roof panel 11 has a sunroof opening 12. The room lamp 17 has a cover part which is mounted on a vehicle body while penetrating an insertion hole 18 of the roof lining 10 and designed to cover an edge part of the insertion hole 18 from inside the vehicle compartment. The sunroof unit 13 has a sunroof frame 14 which is mounted so as to extend substantially along an edge part of the sunroof opening 12. The sunroof frame 14 is provided integrally with a displacement restriction part which is designed to restrict upward displacement of the edge part of the insertion opening 18 of the roof lining 10.

5 Claims, 8 Drawing Sheets

(56) References Cited

U.S. PATENT DOCUMENTS

| | | | | |
|---|---|---|---|---|
| 7,287,890 B2* | 10/2007 | Okabe | ............... | B60Q 3/51 |
| | | | | 362/488 |
| 2013/0058119 A1* | 3/2013 | Chiba | ............... | B60Q 3/51 |
| | | | | 362/520 |

FOREIGN PATENT DOCUMENTS

| JP | 2011-156940 A | 8/2011 |
|---|---|---|
| JP | 2013-208972 A | 10/2013 |

* cited by examiner

ROOF STRUCTURE FOR VEHICLE

CROSS-REFERENCE OF RELATED APPLICATION

This application claims priority of Japanese Patent Application No. 2017-130330 filed in Japan on Jul. 3, 2017, the entire contents of which are incorporated herein by reference.

TECHNICAL FIELD

The present invention relates to a roof structure for a vehicle equipped with a sunroof opening in a roof panel.

BACKGROUND OF THE INVENTION

There is a roof structure for a vehicle in which a roof frame is installed at a vehicle interior side of a roof panel and a vehicle interior room lamp is mounted on the roof frame (see Patent Document 1).

In the roof structure described in Japanese Patent Application Publication No. Hei 10-100790, a roof frame is provided with an insertion opening in which a room lamp is partially inserted, and a roof lining facing the inside of a vehicle compartment is provided with an insertion hole for the room lamp. The room lamp is mounted on the roof frame while being inserted in the insertion hole of the roof lining and the insertion opening of the roof frame and sandwiching a circumferential part of the insertion hole of the roof lining with the roof frame. In the case of this roof structure, since the roof lining is supported while being sandwiched between the room lamp and the roof frame, it is possible to prevent an edge part of the insertion hole of the roof lining from being bent at the time of the lighting operation, the lights-out operation, and the like of the room lamp.

Meanwhile, in the roof structure described in Japanese Patent Application Publication No. Hei 10-100790, the roof lining is supported while being sandwiched between the room lamp and the roof frame; however, depending on the installation location of the room lamp, it may not be able to support the roof lining while sandwiching it between the room lamp and the roof frame. In this case, a dedicated support bracket (displacement restriction member) is mounted on a roof panel side in addition to the roof frame, and the roof lining is sandwiched between the support bracket and the room lamp.

Besides, in the roof structure equipped with a sunroof opening in the roof panel, a sunroof frame of a sunroof unit is mounted substantially along an edge part of the sunroof opening. Accordingly, when the dedicated support bracket for installing the room lamp is mounted on the roof panel side in this type of roof structure, the interference between the support bracket and the sunroof frame must be avoided. For this reason, in this type of roof structure, it is difficult to place the room lamp close to the sunroof opening, which sometimes limits an increase of the opening area of the sunroof opening.

SUMMARY OF INVENTION

The present invention provides a roof structure for a vehicle which enables suppression of bending of the vicinity of a portion of a roof lining on which a room lamp is mounted and enables the room lamp to be placed close to a sunroof opening.

A roof structure for a vehicle according to one embodiment of the present invention employs the following configuration.

Specifically, the roof structure for a vehicle according to the present invention includes: a roof panel (a roof panel 11 of an embodiment, for example) which has a sunroof opening (a sunroof opening 12 of the embodiment, for example); a sunroof unit (a sunroof unit 13 of the embodiment, for example) which is mounted on the roof panel so as to cover the sunroof opening; a roof lining (a roof lining 10 of the embodiment, for example) which is disposed below the roof panel so as to face the inside of a vehicle compartment (a vehicle interior space); and a room lamp (a room lamp 17 of the embodiment, for example) which is mounted on a vehicle body while penetrating an insertion hole (an insertion hole 18 of the embodiment, for example) provided in the roof lining and has a cover part (a peripheral edge of the room lamp body such as a flange part 22 of the embodiment, for example) designed to cover an edge part of the insertion hole from inside the vehicle compartment, the roof structure being characterized in that the sunroof unit has a sunroof frame (a sunroof frame 14 of the embodiment, for example) which is mounted so as to extend substantially along an edge part of the sunroof opening, and the sunroof frame is provided integrally with a displacement restriction part (a locking claw 23 of the embodiment, for example) which is designed to restrict upward displacement of the edge part of the insertion hole of the roof lining.

With the above configuration, the edge part of the insertion hole of the roof lining is covered with the cover part of the room lamp. When the room lamp is pushed upward at the time of the lighting operation, the lights-out operation, and the like, the cover part of the room lamp pushes the edge part of the insertion hole of the roof lining upward. However, since upward displacement of the edge part of the insertion hole of the roof lining is restricted at this time by the displacement restriction part of the sunroof frame, its bending caused by load input from the room lamp is suppressed. In addition, since no displacement restriction member as a separate unit from the sunroof frame is mounted on the roof panel side, it is possible to sufficiently increase the opening area of the sunroof opening without caring about the interference between the sunroof frame and the displacement restriction member.

The roof structure for a vehicle may be configured to further include a reinforcement plate (roof stiffeners 9A and 9B of the embodiment, for example) which is disposed at a vehicle interior side of the roof panel and designed to stiffen the roof panel, and configured so that the reinforcement plate is provided with: an insertion opening (an insertion opening 19 of the embodiment, for example) in which the room lamp is partially inserted; and a frame fixing part (a frame fixing part 27 of the embodiment, for example) which is fixed on the sunroof frame near the insertion opening.

In this case, since the room lamp partially protrudes above the reinforcement plate through the insertion opening of the reinforcement plate, it is possible to place the room lamp closer to the roof panel. Accordingly, by employing this configuration, the vehicle compartment can have a large upper space. Moreover, since the reinforcement plate is fixed on the sunroof frame with the frame fixing part located near the insertion opening, the reinforcement plate reduced in rigidity due to the insertion opening in the reinforcement plate can be reinforced by the fixing part where the reinforcement plate is fixed to the sunroof frame.

The roof structure may be configured so that the frame fixing part is provided at both sides of the insertion opening in a vehicle-widthwise direction, and an edge part of the insertion opening on a side of the sunroof opening may be placed closer to the sunroof opening than a straight line (a straight line L of the embodiment, for example) formed by connecting the frame fixing part at both sides thereof.

In this case, the frame fixing part at both sides of the insertion opening makes it possible to enhance the rigidity of an area near the insertion opening of the reinforcement plate efficiently, and place the room lamp closer to the sunroof opening.

The roof structure may be configured so that the room lamp is mounted on the reinforcement plate, and a mounting part (a screw hole 21 of the embodiment, for example) of the reinforcement plate at which the room lamp is mounted on the reinforcement plate may be placed between the frame fixing part at both sides thereof.

In this case, since the room lamp is disposed on a portion of the reinforcement plate whose rigidity is enhanced by the frame fixing part on both sides of the reinforcement plate, it is possible to enhance rigidity in mounting the room lamp.

The roof structure may be configured so that the sunroof unit includes: the sunroof frame; and a drainage member (a drainage panel 28 of the embodiment, for example) which has a gutter part (a gutter part 28a of the embodiment, for example) located above the sunroof frame and designed to receive a water droplet at a position below the sunroof opening of the roof panel, the sunroof frame has: a mounting face (a mounting surface such as a mounting face 24a of the embodiment, for example) which is fixed to the frame fixing part of the reinforcement plate; and a shelf part (a shelf part 24b of the embodiment, for example) which is placed on the sunroof opening side of the mounting face and below the mounting face, the shelf part includes at least a part of the displacement restriction part, and the gutter part of the drainage member is placed above the shelf part.

In this case, since the gutter part of the drainage member is placed above the shelf part of the sunroof frame that includes at least a part of the displacement restriction part, it is possible to reduce the total vertical height of the sunroof frame and the gutter part of the drainage member. Accordingly, by employing this configuration, the occupied space below the sunroof opening can be reduced.

The roof structure may be configured so that the reinforcement plate has: a first plate member (roof stiffeners 9A of the embodiment, for example) which extends substantially in a longitudinal direction with respect to the vehicle body at both sides of the sunroof opening in the vehicle-widthwise direction; and a second plate member (roof stiffeners 9B of the embodiment, for example) which extends substantially in the vehicle-widthwise direction at both front and rear sides of the sunroof opening, the first plate member is more rigid than the second plate member, the insertion opening is provided in the second plate member, and the sunroof frame is mounted so as to straddle both the second plate member and the first plate member.

The roof of a vehicle is typically longer in the longitudinal direction than in the vehicle-widthwise direction. For this reason, the width of the first plate member placed on both sides in the vehicle-widthwise direction is harder to increase than that of the second plate member placed in the longitudinal direction. In the case of this embodiment, since the first plate member whose width is hard to increase is more rigid than the second plate member whose width is easy to increase, it is possible to suppress an increase in product cost and weight while keeping the entire roof rigid. In addition, since the sunroof frame is mounted so as to straddle both the first plate member and the second plate member, the sunroof frame can reinforce the rigidity of the first plate member.

Effect of the Invention

According to the present invention, since the displacement restriction part designed to restrict upward displacement of the edge part of the insertion hole of the roof lining is provided integrally to the sunroof frame, it is possible to place the room lamp closer to the sunroof opening without incurring bending of the edge part of the insertion hole of the roof lining. In addition, it is possible to reduce the number of components as compared to the case where a dedicated displacement restriction member for restricting upward displacement of the edge part of the insertion hole of the roof lining is installed.

DETAILED DESCRIPTION OF EMBODIMENTS OF THE INVENTION

Hereinbelow, an embodiment of the present invention is described based on the drawings. Note that, throughout the following description, tams "front", "rear", "up", "down", "left", and "right" denote the front, rear, up, down, left, and right with respect to a vehicle unless otherwise noted. In addition, throughout the drawings, the arrow FR indicates the front of the vehicle, the arrow UP indicates the upside of the vehicle, and the arrow LH indicates the left side of the vehicle.

Figure 1:
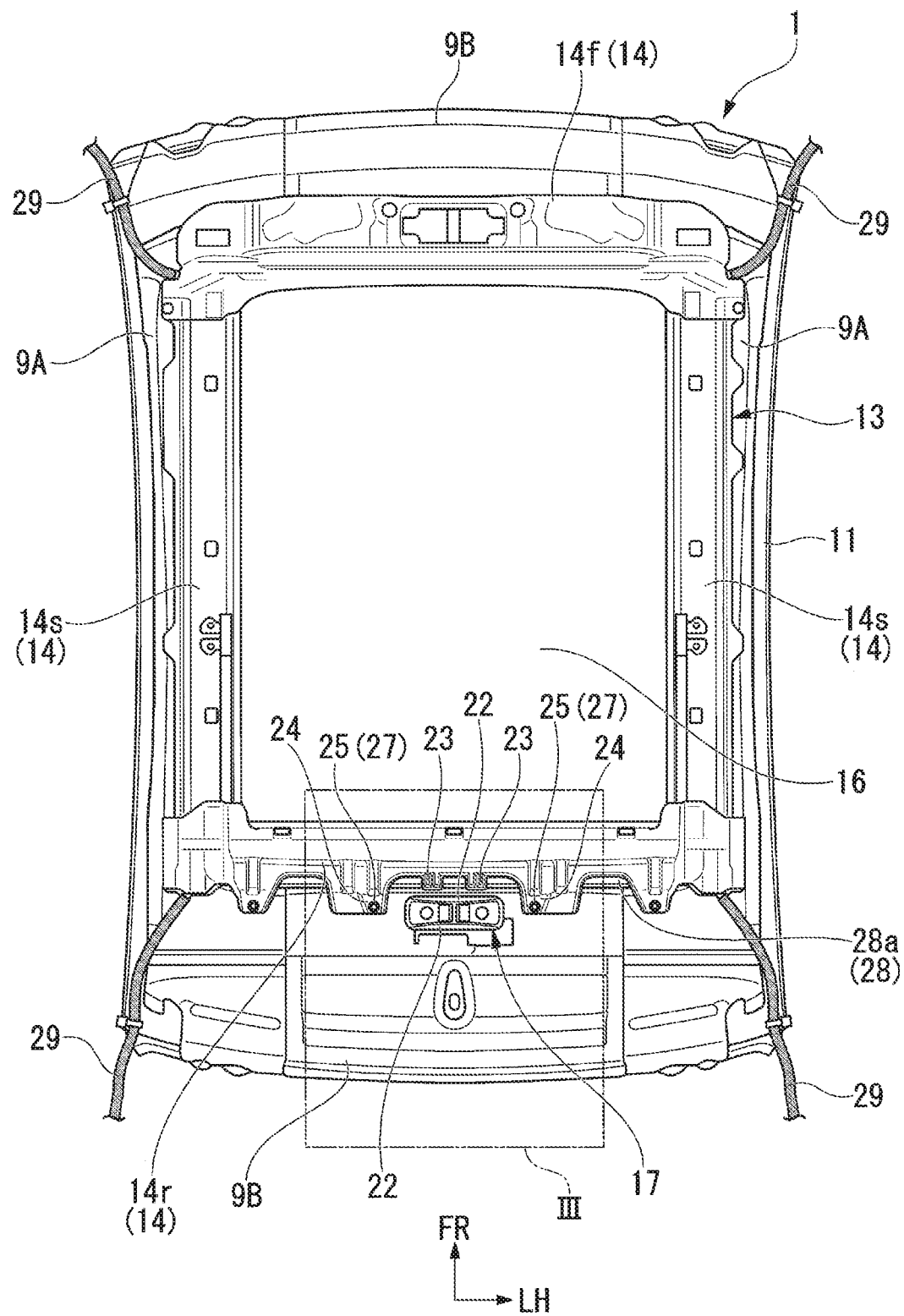
FIG. 1 is a front view of the inside of a vehicle compartment illustrating a roof structure according to an embodiment of the present invention whose members are partially removed.

FIG. 1 is a front view illustrating a roof structure 1 located on the upper side of a vehicle compartment of the vehicle, which is seen from inside the vehicle compartment. Although a roof lining 10 (see FIG. 4 and FIGS. 6 to 8) formed of a multilayer resin member is mounted on the roof structure 1 on the vehicle compartment inner side thereof, the roof structure from which the roof lining 10 is removed is illustrated in FIG. 1.

The roof structure 1 includes a metallic roof panel 11 disposed on the upper side of the vehicle compartment while facing outside of the vehicle. The roof panel 11 has a sunroof opening 12 (see FIG. 2) formed substantially in the shape of a rectangle long in a longitudinal direction with respect to a vehicle body. Multiple roof stiffeners 9A and 9B (reinforcement plates) are joined to the roof panel 11 on the vehicle compartment inner side thereof so as to surround the sunroof opening 12. In addition, a sunroof unit 13 is mounted on a circumferential part of the sunroof opening 12 via the roof stiffeners 9A and 9B. The sunroof unit 13 includes components such as: a substantially rectangular sunroof frame 14 fixed on the circumferential part of the sunroof opening 12 via the roof stiffeners 9A and 9B; a sunroof glass 15 (see FIGS. 6 to 8) partially held on the sunroof frame 14 so as to be slidable; a sunshade 16 capable of covering the sunroof glass 15 on the vehicle compartment inner side thereof; and an opening and shutting mechanism (not illustrated) of the sunroof glass 15.

Figure 2:
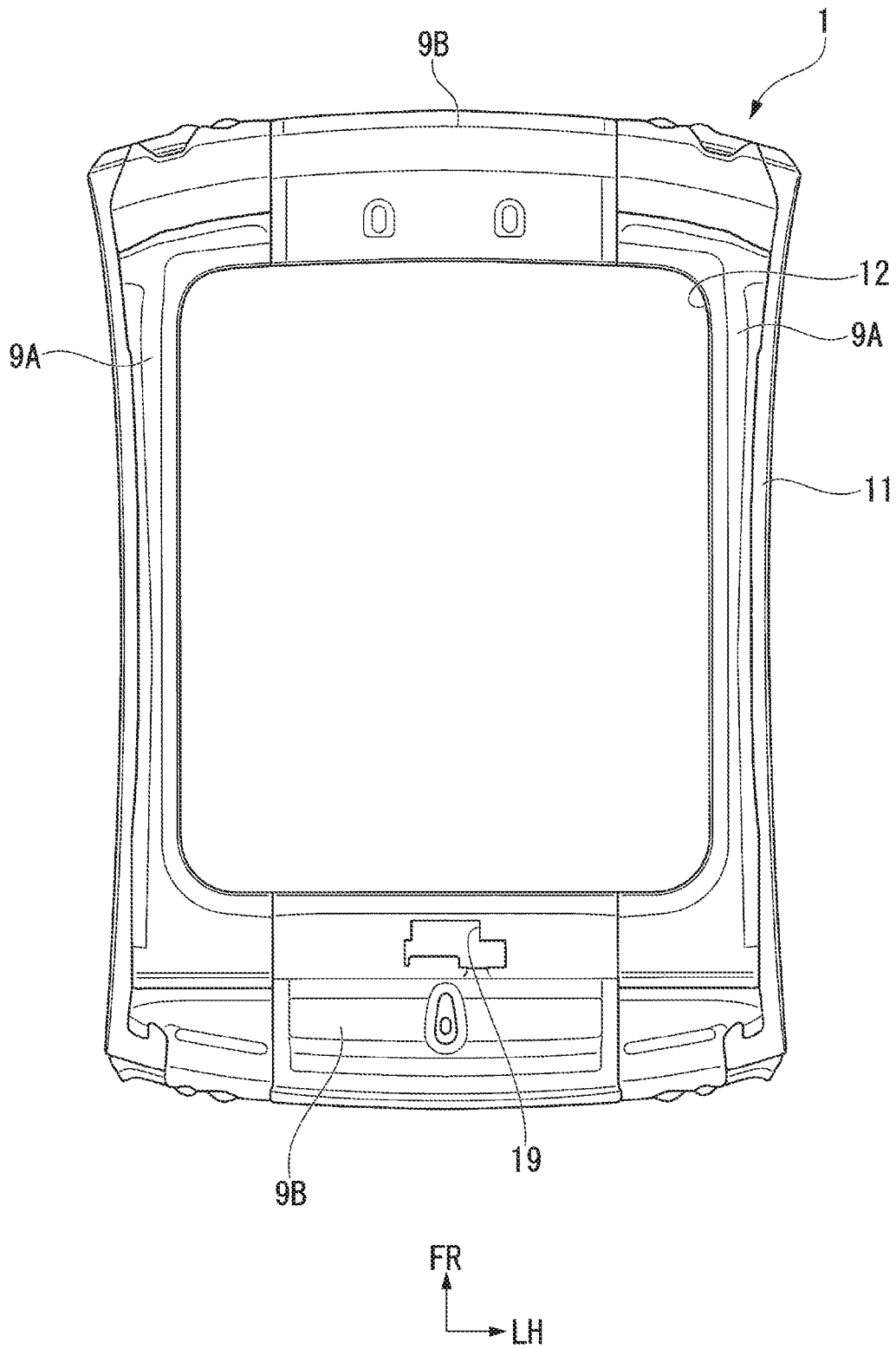
FIG. 2 is a front view of the inside of the vehicle compartment illustrating the roof structure according to the embodiment of the present invention whose members are partially removed.

FIG. 2 is a front view illustrating the roof structure 1 whose components such as the roof lining 10 and the sunroof unit 13 are removed, which is seen from inside the vehicle compartment.

The roof stiffeners 9A are metal plates which extend substantially in the longitudinal direction with respect to the vehicle body at both sides of the sunroof opening 12 in a vehicle-widthwise direction, and the roof stiffeners 9B are metal plates which extend substantially in the vehicle-widthwise direction at both front and rear sides of the sunroof opening 12. Each of the left and right roof stiffeners 9A is not a metal plate of a uniform width, but has on its front edge and rear edge portions that bulge inward in the vehicle-widthwise direction substantially in the shape of the letter "L". The end faces of the bulging portions are joined to or butt against the extending ends of the front and rear roof stiffeners 9B, respectively. The roof stiffeners 9A disposed at the left and right sides of the roof panel 11 are made of a metal material having higher rigidity than that of the roof stiffeners 9B disposed in front of and behind the roof panel 11.

In this embodiment, the roof stiffeners 9A each constitute a first plate member and the roof stiffeners 9B each constitute a second plate member.

As illustrated in FIG. 1, the sunroof frame 14 includes: a front frame part 14*f* that extends substantially along a front edge part of the sunroof opening 12; a rear frame part 14*r* that extends substantially along a rear edge part of the sunroof opening 12; and side frames 14*s* that extend substantially along left and right side edge parts of the sunroof opening 12.

A room lamp 17 for illuminating the vehicle compartment is attached to the rear roof stiffener 9B in a substantially central area thereof in the vehicle-widthwise direction. The room lamp 17 is attached in the substantially central area of the roof stiffener 9B in the vehicle-widthwise direction at a position near a rear edge of the rear frame part 14*r* of the sunroof frame 14.

Figure 3:
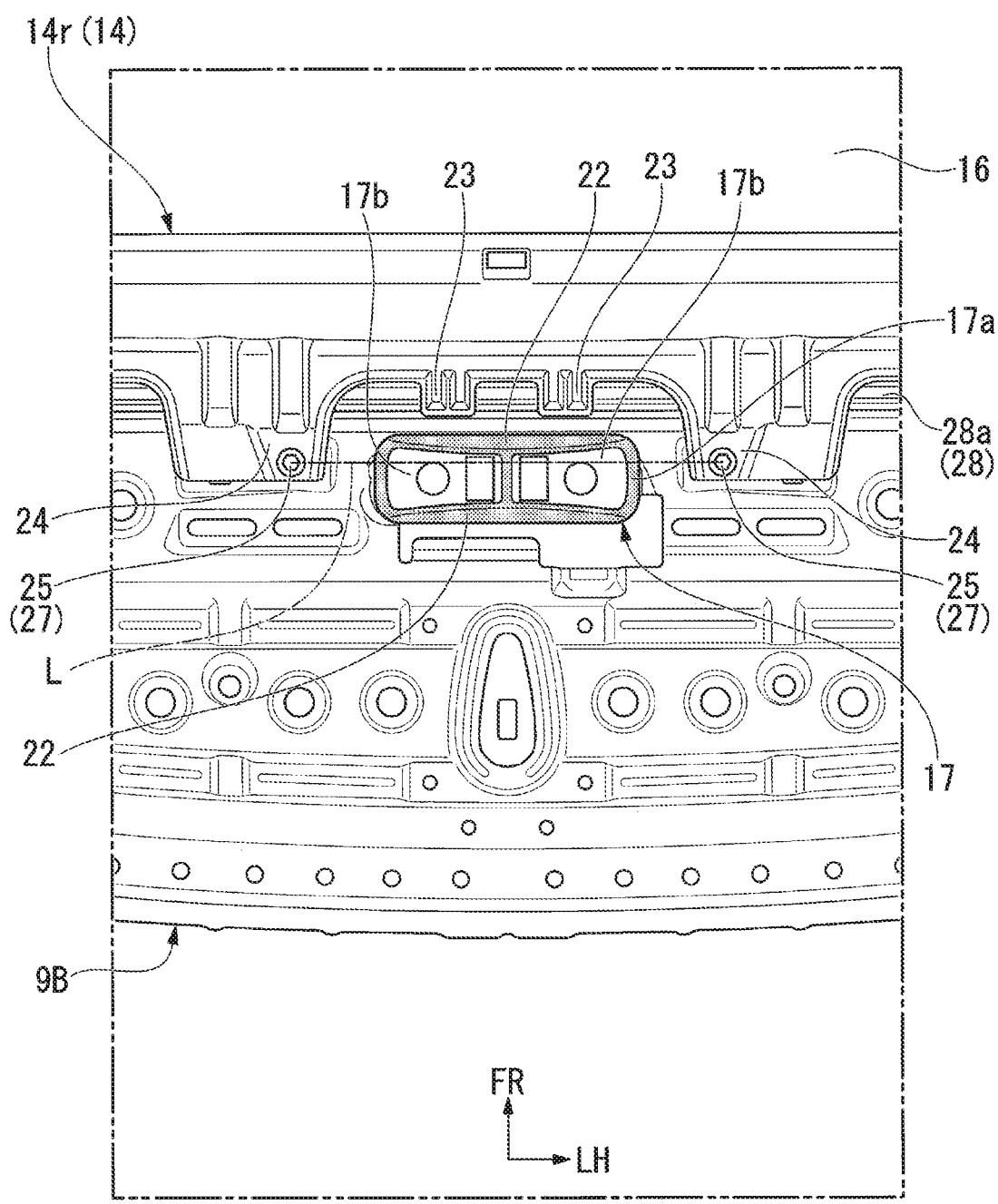
FIG. 3 is an enlarged view of a portion III of FIG. 1 of the roof structure according to the embodiment of the present invention.
Figure 4:
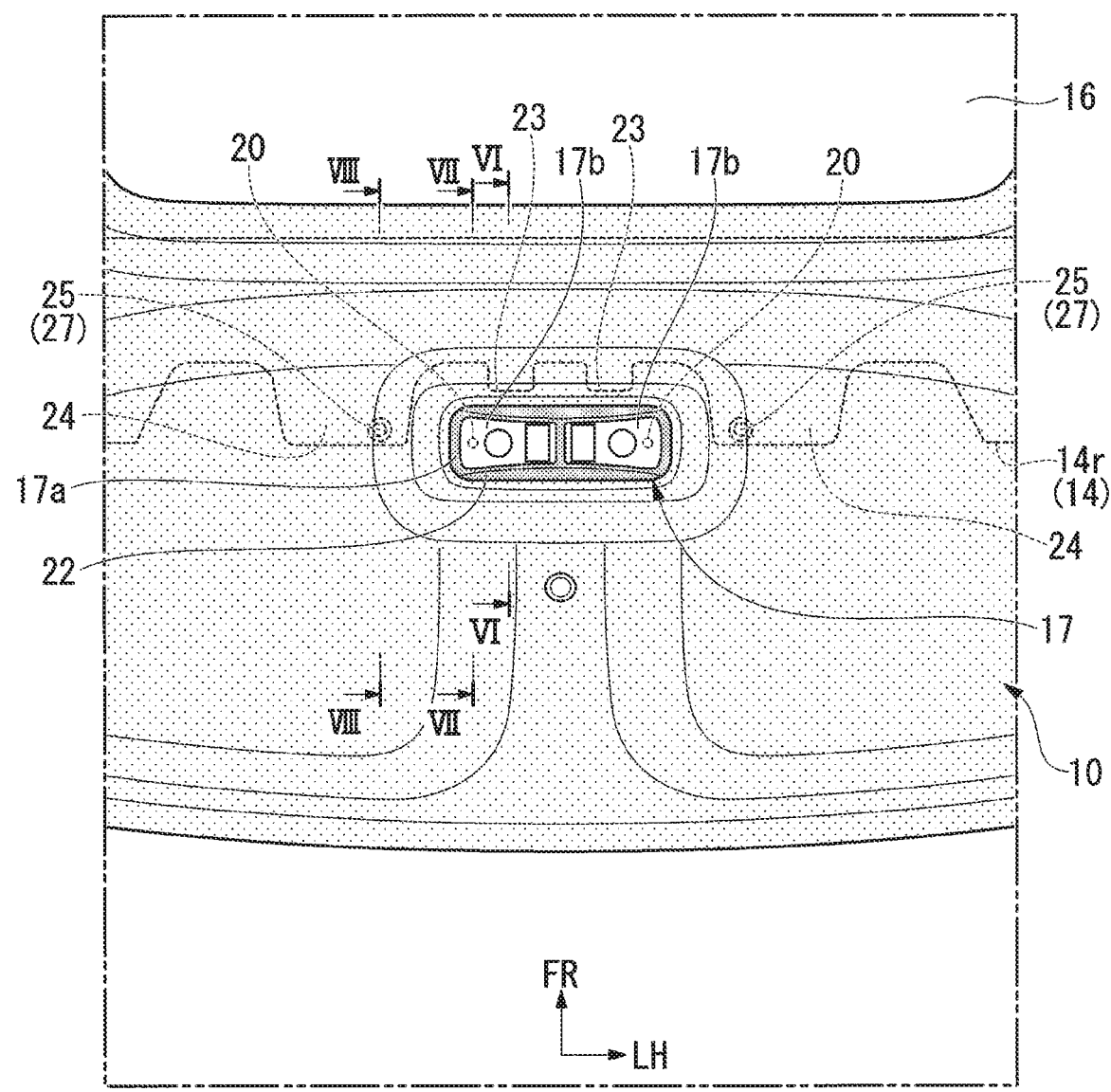
FIG. 4 is a front view of the inside of a vehicle illustrating a part of the roof structure according to the embodiment of the present invention.
Figure 5:
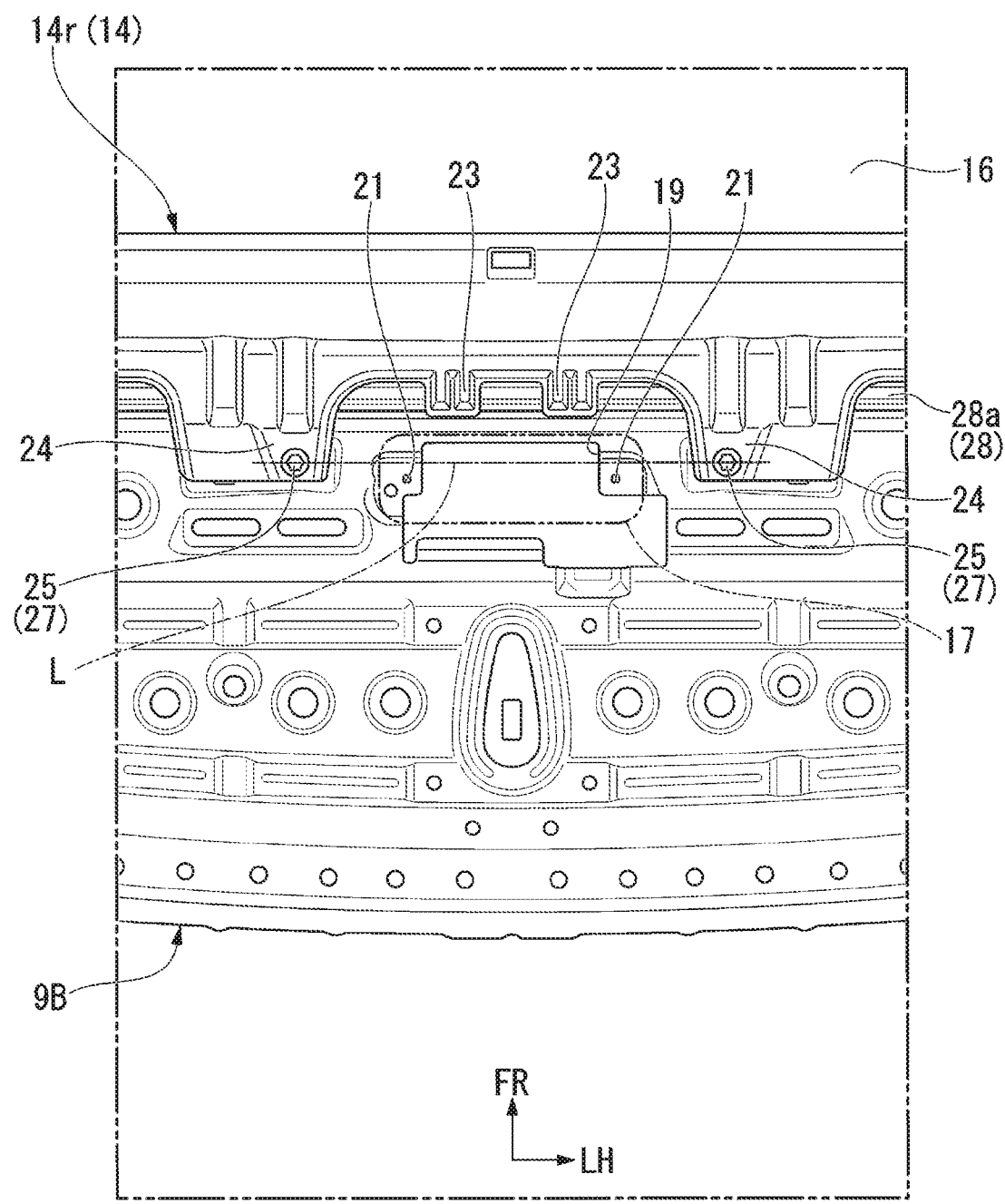
FIG. 5 is an enlarged view, as in FIG. 3, illustrating the roof structure according to the embodiment of the present invention whose roof lamp is removed.

FIG. 3 is an enlarged view of a portion III of FIG. 1, and FIG. 4 is a view illustrating substantially the same portion as the portion III of FIG. 1 on which the roof lining 10 is disposed. In addition, FIG. 5 is a view illustrating a state where the room lamp 17 is removed from FIG. 3. Further, FIG. 6 is a sectional view taken along the line VI-VI in FIG. 4, and FIGS. 7 and 8 are sectional views taken along the line VII-VII in FIG. 4 and the line VIII-VIII in FIG. 4, respectively.

Figure 6:
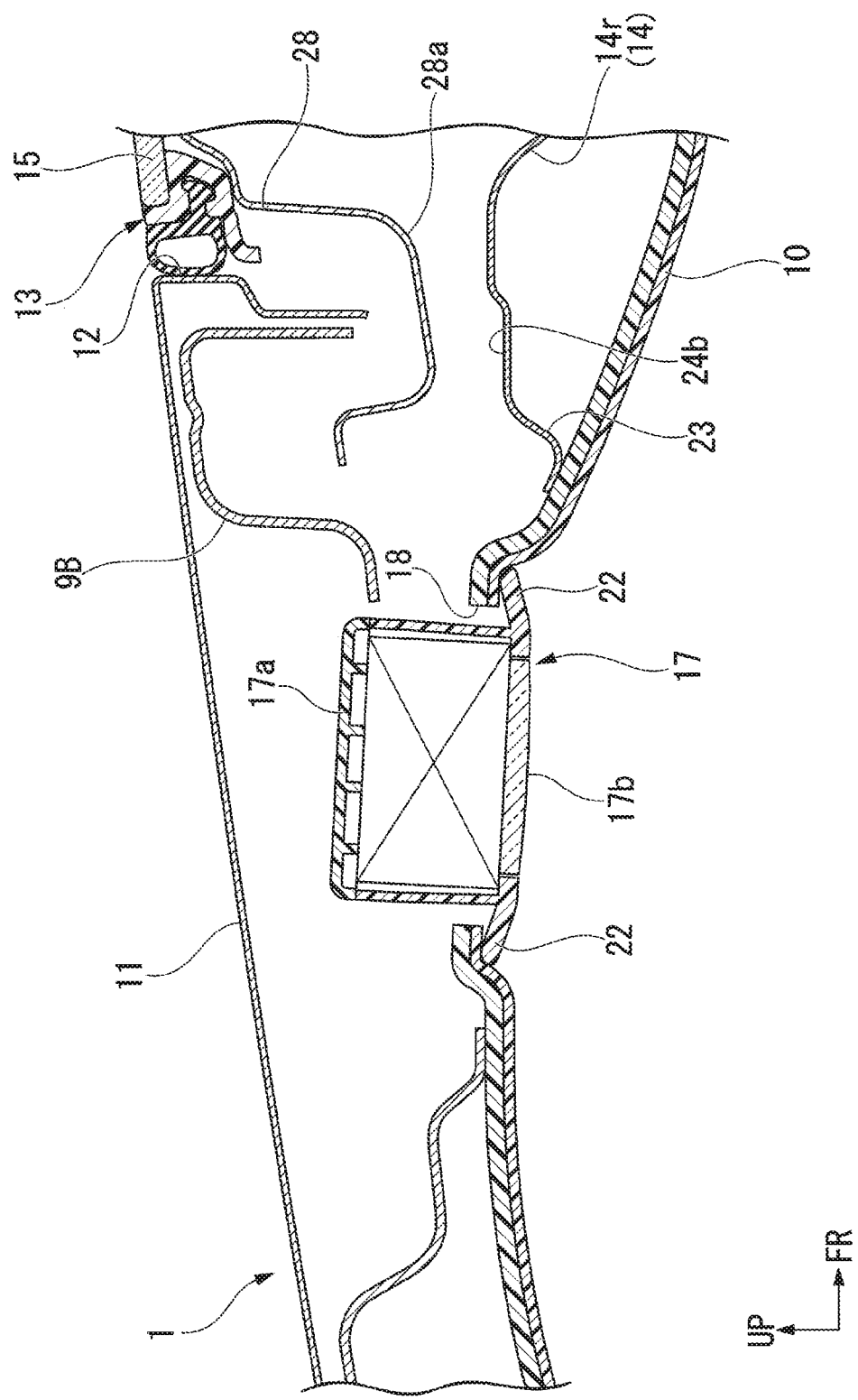
FIG. 6 is a sectional view of the roof structure according to the embodiment of the present invention taken along the line VI-VI in FIG. 4.
Figure 7:
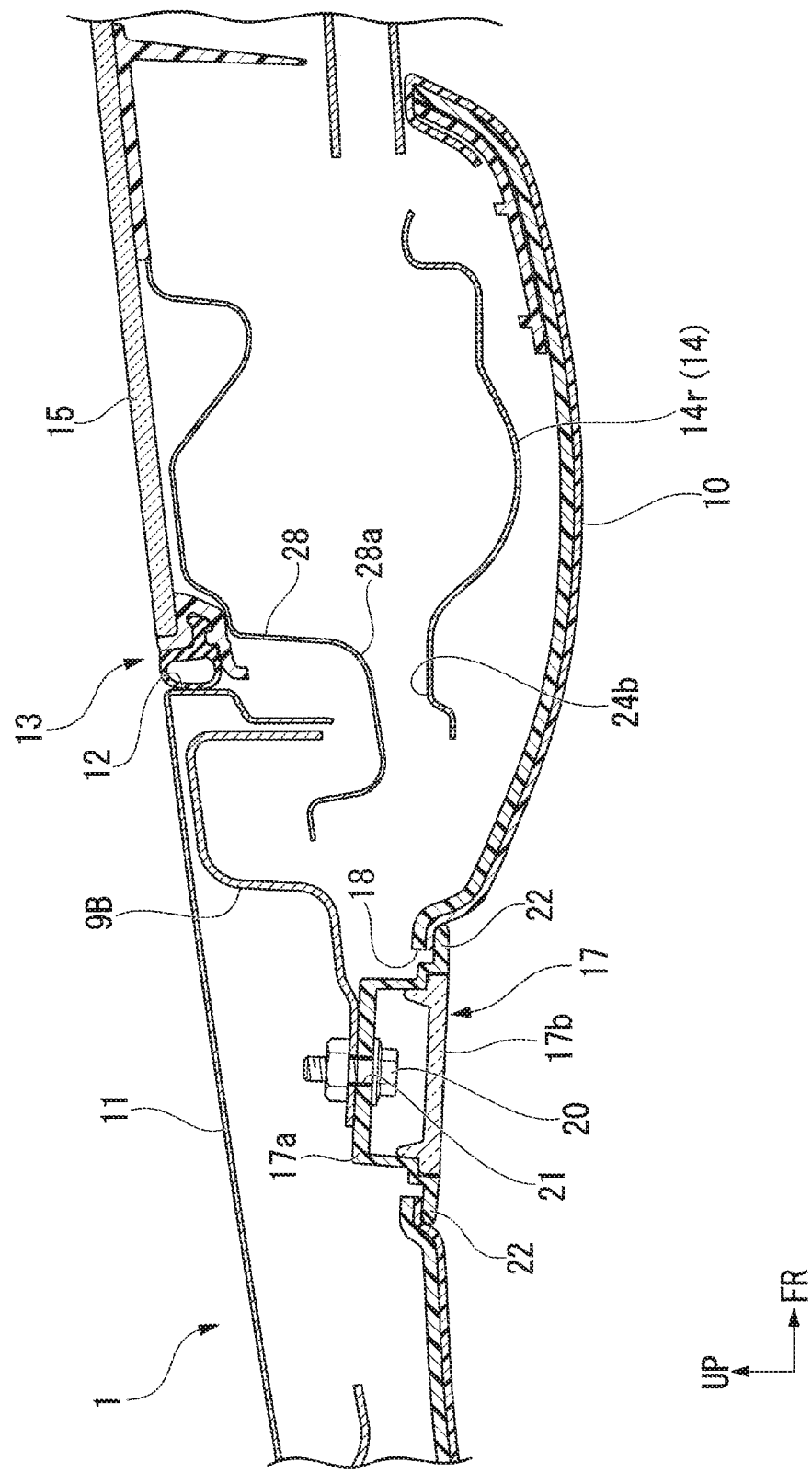
FIG. 7 is a sectional view of the roof structure according to the embodiment of the present invention taken along the line VII-VII in FIG. 4.
Figure 8:
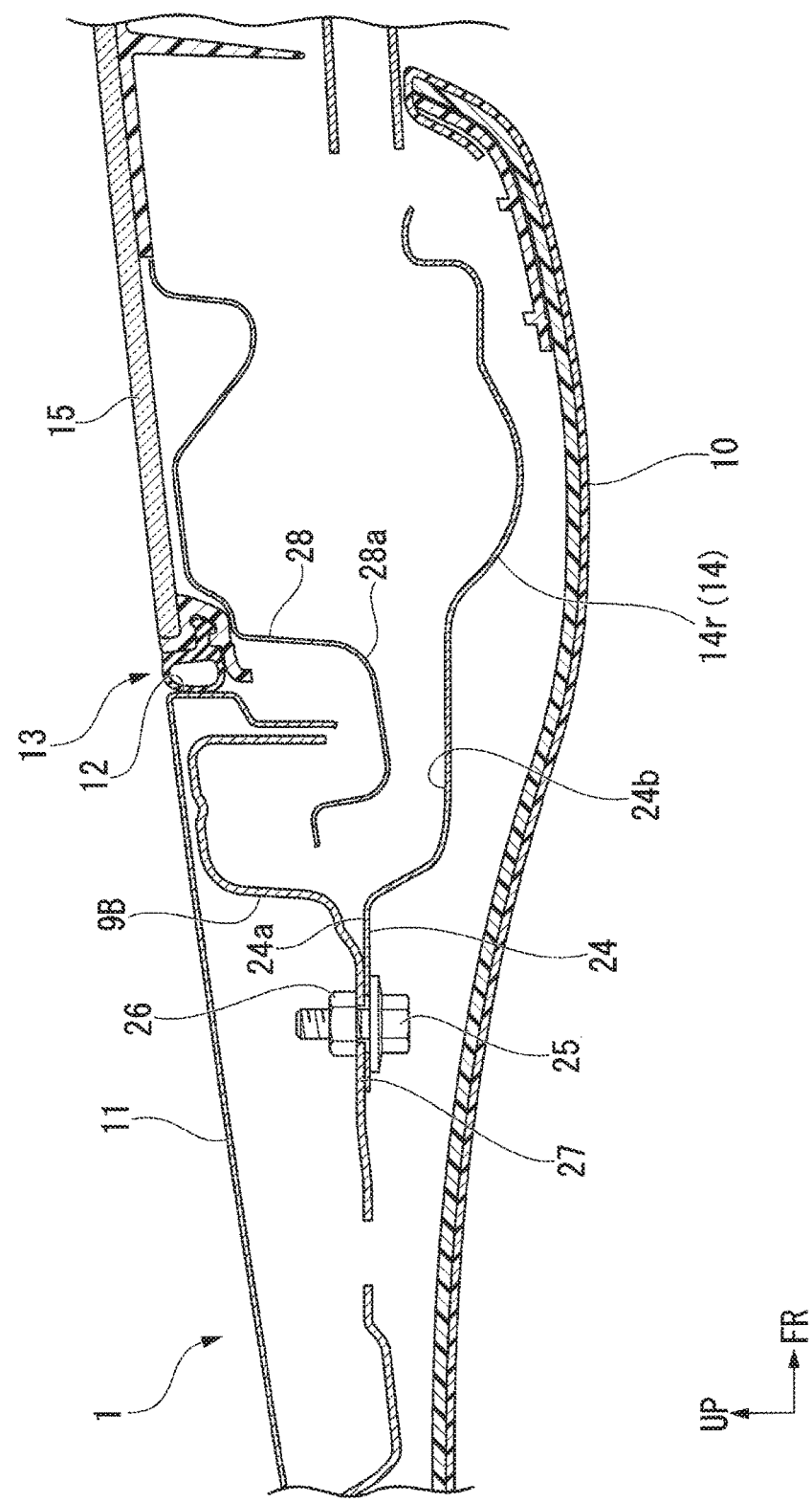
FIG. 8 is a sectional view of the roof structure according to the embodiment of the present invention taken along the line VIII-VIII in FIG. 4.

As illustrated in FIG. 4 and FIGS. 6 to 8, the roof lining 10 is mounted on the roof stiffeners 9A and 9B and the sunroof frame 14 so as to cover the roof stiffeners 9A and 9B and the sunroof frame 14 on the vehicle compartment inner side thereof at a position below the roof panel 11. As illustrated in FIGS. 6 and 7, the roof lining 10 has a substantially rectangular insertion hole 18 in which a basal part of the room lamp 17 (an upper part of a lamp case 17*a* to be described later) is inserted. In addition, as illustrated in FIG. 5, the rear roof stiffener 9B is provided with: an insertion opening 19 in which an upper bulging part of the basal part of the room lamp 17 is inserted; and a pair of screw holes 21 which is used for fastening and fixing the room lamp 17 with screws 20 (see FIG. 7).

The room lamp 17 has a lamp unit and a contact mechanism (not illustrated) housed inside the substantially rectangular lamp case 17*a*. A translucent switch panel 17*b* which also works as a translucent plate designed to let lamp light pass through inside the vehicle compartment is attached to the lamp case 17*a* on the vehicle compartment inner side thereof. A flange part 22 which is a cover part designed to cover an edge part of the insertion hole 18 of the roof lining 10 from inside the vehicle compartment extends from the circumference of a vehicle-compartment-inner-side edge part of the lamp case 17*a*. While the upper part of the lamp case 17*a* is inserted into the insertion hole 18 of the roof lining 10 and the insertion opening 19 of the roof stiffener 9B, the room lamp 17 is fastened and fixed on the roof stiffener 9B with the screws 20. Note that the work of fastening the screws 20 is performed while the switch panel 17*b* is removed from the lamp case 17*a* in the room lamp 17.

Here, a portion of the roof lining 10 away from the sunroof opening 12 is in contact with and supported by the roof stiffeners 9A and 9B, while a portion thereof close to the sunroof opening 12 is in contact with and supported by the sunroof frame 14 mounted on the roof stiffeners 9A and 9B on the lower face side thereof. Accordingly, as illustrated in FIG. 6, the roof lining 10 gently curves and bulges toward the inside of the vehicle compartment in a part on the periphery of the sunroof opening 12. For this reason, the edge part of the insertion hole 18 of the roof lining 10 in a portion close to the sunroof opening 12 is more likely to be pushed upward by the flange part 22 of the room lamp 17 than in a portion away from the sunroof opening 12.

As illustrated in FIGS. 3, 4, and 6, the rear frame part 14*r* of the sunroof frame 14 has a pair of locking claws 23, which extends toward an area where the room lamp 17 is installed, famed in a rear edge part of a portion thereof close to the room lamp 17 (central area in the vehicle-widthwise direction). In an area near the front side of the room lamp 17, the locking claws 23 are in contact with a front edge part of the insertion hole 18 of the roof lining 10 from above. The locking claws 23 are designed to restrict upward displacement of the front edge part of the insertion hole 18 of the roof lining 10. The locking claws 23 constitute a displacement restriction part of the sunroof frame 14. Note that a bead is provided in each locking claw 23 as appropriate to enhance the rigidity.

In addition, the rear frame part 14*r* of the sunroof frame 14 has a pair of fixing pieces 24 which extends toward the rear of the vehicle body in areas outside the pair of locking claws 23 in the vehicle-widthwise direction. End parts of the fixing pieces 24 respectively extend toward positions at both sides of the installation area of the room lamp 17 of the roof stiffener 9B in the vehicle-widthwise direction. As illustrated in FIGS. 3 to 5 and FIG. 8, the end parts of the fixing pieces 24 are coupled to an upper face of the roof stiffener 9B with bolts 25 and nuts 26 at positions close to the inner side in the vehicle-widthwise direction. The portions where the roof stiffener 9B is fastened to the pair of fixing pieces 24 with the bolts 25 and the nuts 26 on the roof stiffener constitute frame fixing parts 27 in this embodiment.

The pair of frame fixing parts 27 on the roof stiffener 9B is provided near both sides of the insertion opening 19 of the roof stiffener 9B in the vehicle-widthwise direction. As illustrated in FIGS. 3 and 5, an edge part of the insertion opening 19 close to the sunroof opening 12 (on the front side thereof) is placed closer to the sunroof opening 12 than (forward of) a straight line L formed by connecting the fixation centers of the frame fixing parts 27 at both sides of the insertion opening.

Besides, a mounting part of the roof stiffener 9B at which the room lamp 17 is mounted on the roof stiffener (portions around the screw holes 21) are arranged between the frame fixing parts 27 on both sides of the roof stiffener 9B.

Further, as illustrated in FIGS. 6 to 8, the sunroof unit 13 includes a drainage panel (drainage member) 28 which is located above the sunroof frame 14 and has a gutter part 28a designed to receive water droplets having flowed into the sunroof opening 12, at a position below the sunroof opening 12 of the roof panel 11. The gutter part 28a of the drainage panel 28 is disposed throughout the circumference of the sunroof opening 12. Water droplets having been captured by the gutter part 28a is drained to the lower side of the vehicle through drainage pipes 29 illustrated in FIG. 1.

Here, as illustrated in FIG. 8, the rear frame part 14r has: a mounting face 24a of each fixing piece 24 which is fixed to the frame fixing part 27 of the roof stiffener 9B; and a shelf part 24b which is placed closer to the sunroof opening 12 than (forward of) the mounting face 24a and below the mounting face 24a. A part of the shelf part 24b close to the front side of the vehicle body extends in the vehicle-widthwise direction. As illustrated in FIG. 6, the shelf part 24b includes, in a part thereof in the vehicle-widthwise direction, a basal part of the locking claw 23 which is the displacement restriction part. As illustrated in FIGS. 6 to 8, the gutter part 28a of the drainage panel 28 extending along the rear edge part of the sunroof opening 12 is disposed above the shelf part 24b of the rear frame part 14r.

Note that the rear frame part 14r of the sunroof frame 14 is mounted so as to straddle not merely the high-rigidity roof stiffener 9B (second plate member) having the insertion opening 19 but both of the roof stiffener 9B and the low-rigidity roof stiffeners 9A (first plate members) arranged outside this roof stiffener in the vehicle-widthwise direction.

As has been described above, in the roof structure 1, the edge part of the insertion hole 18 of the roof lining 10 is covered with the flange part 22 of the room lamp 17. Accordingly, when the room lamp 17 is pushed upward at the time of the lighting operation, the lights-out operation, and the like, the flange part 22 of the room lamp 17 pushes the edge part of the insertion hole 18 of the roof lining 10 upward. In particular, the front edge part of the insertion hole 18 that curves and bulges downward is likely to be pushed upward hard by the front-side flange part 22 of the room lamp 17.

However, in the roof structure 1 according to this embodiment, the locking claws 23 provided integrally to the rear frame part 14r of the sunroof frame 14 are in contact with the front edge part of the insertion hole 18 of the roof lining 10 from above. Thus, the locking claws 23 can restrict upward bending of the edge part of the insertion hole 18 of the roof lining 10 due to the operation on the room lamp 17. In addition, in the roof structure 1 according to this embodiment, since no displacement restriction member as a separate unit is mounted on the roof panel 11 side, it is possible to sufficiently increase the opening area of the sunroof opening 12 without caring about the interference between the sunroof frame 14 and the separate displacement restriction member.

Accordingly, if the roof structure 1 according to this embodiment is employed, it is possible to place the room lamp 17 closer to the sunroof opening 12 without incurring bending of the edge part of the insertion hole 18 of the roof lining 10. In addition, the roof structure 1 according to this embodiment makes it possible to reduce the number of components as compared to the case where a dedicated displacement restriction member for restricting upward displacement of the edge part of the insertion hole 18 of the roof lining 10 is installed.

In addition, in the roof structure 1 according to this embodiment, the insertion opening 19 in which the upper part of the lamp case 17a of the room lamp 17 is inserted is placed in the roof stiffener 9B disposed below the roof panel 11, and the frame fixing parts 27 fixed on the rear frame part 14r of the sunroof frame 14 is placed near the insertion opening 19 of the roof stiffener 9B. In the case of this embodiment, since the lamp case 17a of the room lamp 17 partially protrudes above the roof stiffener 9B through the insertion opening 19 of the roof stiffener 9B, it is possible to place the room lamp 17 closer to the roof panel 11. Accordingly, by employing this configuration, it is possible to reduce the amount of protrusion of the room lamp 17 toward the inside of the vehicle compartment so that the vehicle compartment has a large upper space. Moreover, in the case of the roof structure 1 according to this embodiment, since the roof stiffener 9B is fixed on the rear frame part 14r of the sunroof frame 14 with the frame fixing parts 27 located near the insertion opening 19, the roof stiffener 9B reduced in rigidity due to the insertion opening 19 in the roof stiffener 9B can be reinforced by the fixing part where the roof stiffener is fixed to the rear frame part 14r.

Moreover, in the roof structure 1 according to this embodiment, the frame fixing parts 27 on the roof stiffener 9B are arranged close to each other at both sides of the insertion opening 19 in the vehicle-widthwise direction, and the edge part of the insertion opening 19 on the front side thereof (on the side of the sunroof opening 12) is placed forward of (on the side of the sunroof opening 12) the straight line L formed by connecting the centers of the frame fixing parts 27 at both sides of the insertion opening. Thus, the frame fixing parts 27 at both sides of the insertion opening 19 make it possible to enhance the rigidity of an area near the insertion opening 19 of the roof stiffener 9B efficiently, and place the room lamp 17 closer to the sunroof opening 12.

Further, in the case of the roof structure 1 according to this embodiment, the room lamp 17 is attached to the roof stiffener 9B with the screws 20, and the parts of the roof stiffener 9B at which the room lamp 17 is attached to the roof stiffener (screw holes 21) are arranged between the frame fixing parts 27 at both sides thereof. Accordingly, by employing this configuration, the room lamp 17 is disposed on a portion of the roof stiffener 9B whose rigidity is enhanced by the frame fixing parts 27 on both sides of the roof stiffener, which makes it possible to enhance rigidity in mounting the room lamp 17.

Furthermore, in the roof structure 1 according to this embodiment, the rear frame part 14r of the sunroof frame 14 is provided with: the mounting faces 24a which are respectively fixed to the frame fixing parts 27 of the roof stiffener 9B; and the shelf parts 24b which are each placed forward of (on the side of the sunroof opening 12) the mounting face 24a and below the mounting face 24a, and at includes at least a part of the locking claw 23 being the displacement restriction part. Besides, the gutter part 28a of the drainage panel 28 that receives water droplets below the sunroof opening 12 of the roof panel 11 is placed above the shelf part 24b of the rear frame part 14r. This makes it possible to reduce the total vertical height of the rear frame part 14r of the sunroof frame 14 and the gutter part 28a of the drainage panel 28. Accordingly, by employing this configuration, the space occupied by the members behind and below the sunroof opening 12 can be reduced, whereby the vehicle compartment can have more space available.

In addition, the roof structure 1 according to this embodiment has: the roof stiffeners 9A (first plate members) which extend substantially in the longitudinal direction with respect to the vehicle body at both sides of the sunroof opening 12 in the vehicle-widthwise direction; and the roof stiffeners 9B (second plate members) which extend substantially in the vehicle-widthwise direction at both front and rear sides of the sunroof opening 12, and the roof stiffeners 9A on both sides in the vehicle-widthwise direction are more rigid than the front and rear roof stiffeners 9B. In the case of this embodiment, since the roof stiffeners 9A on both sides in the vehicle-widthwise direction whose width in a direction intersecting the direction they extend is hard to increase are more rigid than the front and rear roof stiffeners 9B whose width in a direction intersecting the direction they extend is easy to increase, it is possible to suppress an increase in product cost and weight while keeping the entire vehicle roof rigid.

Moreover, in the roof structure 1 according to this embodiment, the insertion opening 19 in which the room lamp 17 is partially inserted is provided in the rear roof stiffener 9B, and the rear frame part 14r of the sunroof frame 14 is mounted so as to straddle not only the rear roof stiffener 9B but also the roof stiffeners 9A on both sides in the vehicle-widthwise direction. Accordingly, the rear roof stiffener 9B with less rigidity can be reinforced efficiently by the rear frame part 14r of the sunroof frame 14. Thus, by employing this configuration, it is possible to enhance the rigidity of the area where the room lamp 17 is installed.

Note that, the present invention is not limited to the above embodiment, and various design changes are possible within a range not departing from the gist of the invention.

The invention claimed is:

1. A roof structure for a vehicle comprising:
a roof panel which has a sunroof opening;
a sunroof unit which is disposed in said sunroof opening of said roof panel so as to cover said sunroof opening;
a roof lining which is disposed at a lower part of said roof panel on a side which faces a vehicle interior side;
a room lamp which is mounted on a vehicle body in such position that the room lamp is inserted into an insertion hole formed in said roof lining, the room lamp having a cover part configured to cover a peripheral edge part of said insertion hole from the vehicle interior side;
a sunroof frame which is disposed in the sunroof unit and extends substantially along an edge part of said sunroof opening; and
a reinforcement plate which is disposed at the vehicle interior side of said roof panel and designed to reinforce said roof panel, said reinforcement plate being provided with an insertion opening in which a portion of said room lamp is inserted and a frame fixing part configured to fix said reinforcement plate to said sunroof frame in a vicinity of said insertion opening, wherein
said sunroof frame is provided integrally with a displacement restriction part which is configured to restrict upward displacement of said peripheral edge part of said insertion hole of said roof lining,
said frame fixing part is provided at both sides of said insertion opening in a vehicle-widthwise direction,
an edge part of said insertion opening on a side of said sunroof opening is placed closer to said sunroof opening than a straight line formed by connecting said frame fixing parts at both sides of said insertion opening,
said room lamp is mounted on said reinforcement plate, and
a mounting part of said reinforcement plate at which said room lamp is mounted on said reinforcement plate is placed between said frame fixing parts at both sides of said insertion opening.

2. The roof structure for a vehicle according to claim 1, wherein
said sunroof unit comprises: said sunroof frame; and a drainage member which has a gutter part located above said sunroof frame and configured to receive a water droplet at a position below said sunroof opening of said roof panel,
said sunroof frame has: a mounting surface which is fixed to said frame fixing part of said reinforcement plate; and a shelf part which is placed closer to said sunroof opening than said mounting surface and below said mounting surface,
said shelf part includes at least a part of said displacement restriction part, and
said gutter part of said drainage member is placed above said shelf part.

3. The roof structure according to claim 1, wherein
said reinforcement plate comprises: a first plate member which extends substantially in a longitudinal direction with respect to said vehicle body at both sides of said sunroof opening in the vehicle-widthwise direction; and a second plate member which extends substantially in the vehicle-widthwise direction at both front and rear sides of said sunroof opening,
said first plate member is more rigid than said second plate member,
said insertion opening is provided in said second plate member, and
said sunroof frame is mounted so as to straddle both said second plate member and said first plate member.

4. A roof structure for a vehicle comprising:
a roof panel which has a sunroof opening;
a sunroof unit which is disposed in said sunroof opening of said roof panel so as to cover said sunroof opening;
a roof lining which is disposed at a lower part of said roof panel on a side which faces a vehicle interior side;
a room lamp which is mounted on a vehicle body in such position that the room lamp is inserted into an insertion hole formed in said roof lining, the room lamp having a cover part configured to cover a peripheral edge part of said insertion hole from the vehicle interior side;
a sunroof frame which is disposed in the sunroof unit and extends substantially along an edge part of said sunroof opening; and
a reinforcement plate which is disposed at the vehicle interior side of said roof panel and designed to reinforce said roof panel, said reinforcement plate being provided with an insertion opening in which a portion of said room lamp is inserted and a frame fixing part configured to fix said reinforcement plate to said sunroof frame in a vicinity of said insertion opening, wherein said sunroof frame is provided integrally with a displacement restriction part which is configured to restrict upward displacement of said peripheral edge part of said insertion hole of said roof lining.

5. The roof structure for the vehicle according to claim 4, wherein said frame fixing part is provided at both sides of said insertion opening in a vehicle-widthwise direction, and an edge part of said insertion opening on a side of said sunroof opening is placed closer to said sunroof opening than a straight line formed by connecting said frame fixing parts at both sides of said insertion opening.

* * * * *